2,782,190
Patented Feb. 19, 1957

2,782,190
DEPOLYMERIZED ALGINIC ACID DERIVATIVES

Karl A. Fischer, Ahrensburg, and Herbert Sydow, Hamburg, Germany

No Drawing. Application March 8, 1952, Serial No. 275,662

Claims priority, application Germany March 10, 1951

5 Claims. (Cl. 260—209.6)

The present invention relates to a process for depolymerizing alginic acid derivatives and to a process for treating sand and clay, i. e. in the form of drilling mud with a depolymerized alginic acid derivative so as to increase the water-binding properties of the drilling mud.

It is an object of the present invention to provide a process for partially depolymerizing alginic acid and derivatives thereof so as to form a partially depolymerized alginic acid derivative having a lower molecular weight and size than naturally found alginic acid and derivatives.

It is a further object of the present invention to provide a process for preparing partially depolymerized alginic acid derivatives, which derivatives give solutions high concentration at lower viscosity than natural alginic acid and derivatives thereof.

It is a still further object of the present invention to provide a process for producing partially depolymerized alginic acid derivative having about one tenth the molecular size of normal alginic acid.

It is a further object of the present invention to provide a process for stabilizing drilling mud.

It is another object of the present invention to provide a process for treating sand, clay and the like such as drilling mud, so as to increase the water-binding property of the same.

With the above objects in view, the present invention mainly consists in forming a partially depolymerized alginic acid derivative by treating an aqueous solution of at least one water soluble derivative of alginic acid at a raised temperature with an oxidizing agent in the event that the solution has a pH of 7 or more and with a reducing agent in the event that the solution has a pH of less than 7, thereby partially depolymerizing said alginic acid derivative; and collecting said partially depolymerized alginic acid derivative.

The process for conditioning drilling mud consists in treating the drilling mud, with an aqueous solution of partially depolymerized alginic acid derivative, depolymerized as described in the present invention, so as to increase the water binding property of said drilling mud.

Derivatives of alginic acid, especially the alkali salts, have in the last decade found many applications in various fields of technical use. They serve for sizing textiles, for producing fibrous materials, as emulsifiers, as intermediate layers in safety glass, as addition to pressurized substances, etc. Lately, alginic acid derivatives have found use for the stabilization of drilling mud, for the solidification of soil and sands, for the production of packing material and for the solidification of hydrocarbons.

Many uses, especially the solidification of hydrocarbons, is hindered by the high viscosity of aqueous alginate solutions. Hitherto, this has been overcome in part by taking the sea weed from which the alginate is produced at particular seasons when the degree of polymerization of the polymannuronic acid is a lower point. However, it was still found desirable to have smaller molecular size alginic acid which cannot be found in nature.

The present invention provides a process for altering the molecular size of alginic acid while preserving its characteristic as polymannuronic acid. According to the present process the alginic acid is treated with an oxidizing agent which does not react chemically with the alginic acid to produce a new substance, but rather, merely depolymerizes the alginic acid. The characteristic reaction properties of the alginic acid, particularly its property of precipitating insoluble calcium alginate from solutions of alkali metal alginates, remain.

It was surprisingly found that according to the process of the present invention the characteristic reaction properties of alginic acid are not destroyed, but that merely a lower polymer of mannuronic acid is obtained. According to this process, an aqueous solution or a jelly is treated either with an oxidizing agent at a pH of 7 or more, or with a reducing agent at a pH of less than 7, the oxidizing and reducing agents acting as depolymerization agents at the pH of the reaction solution. These depolymerization agents are employed in a minor proportion and the reaction solution treated therewith at a raised temperature. As exemplatory of depolymerization agents according to the process of the present invention though the invention is by no means limited thereto, are hydrogen peroxide, air, and the like as oxidizing agents and hydrazine sulphate and the like as reducing agents.

According to the present invention, the depolymerization of the alginic acid derivative is accomplished by treating an alkali metal alginate solution of any concentration at a pH of 7 or more with air, while warming and stirring the solution. It is preferable, however, to use aqueous solutions or jellies of 5–20% of a soluble alginic acid derivative. This aqueous solution is then treated with alkali so as to raise the pH of the solution to about 9 and the resulting solution is then treated with about 0.01% of hydrogen superoxide solution. Likewise, an excellent reaction is produced by treating a 5–20% solution of a soluble alginic acid derivative in water with acid so as to lower the pH to about 5 and then with about 0.1% hydrazine sulphate. The reactions are preferably carried out at a temperature of about 100° C.

The process of the present invention results in the production of a depolymerized alginic acid derivative having a molecular size of about one tenth the molecular size of the original alginic acid. However, the reaction characteristics of the depolymerized alginic acid are the same as the reaction characteristics of the original alginic acid. This is astounding when one considers that normal alginates contain about 100 mannuronic acid molecules and that the alginic acid depolymerized according to the present invention contains about one tenth the number of mannuronic acid molecules. The resulting product is approximately a decameric having about 10 molecules of mannuronic acid per each molecule of the depolymerized alginic acid.

The viscosity of the starting alginate solution is greatly reduced by the depolymerization of the alginic acid derivatives into a decamer. It is therefore possible to make highly concentrated solutions of such depolymerized alginic acid derivatives, which solution is so fluid that it may be drawn up into capillary tubes. It is therefore possible to carry much more active and concentrated alginate solutions in such tubes.

It follows, of course, that more calcium is necessary in order to react with all the alginates and to solidify the same. Therefore, such solutions have a lower sensitivity to precipitation by metallic salts, which metallic salts are present when drilling. By the application of alginates to solidify hydrocarbons, the use of partially depolymerized alginates, according to the process of the present invention, allows for the use of a more concentrated solution of the same which produces better solidified hydrocarbons. These hydrocarbons have a lower evaporation loss during storage. The impregnation of packing material with partially depolymerized alginates, depolymerized according to the present invention, results in a better impregnation of the packing material than was obtainable by the use of ordinary alginates.

The depolymerization of the alginate in a weakly alkali solution stops almost automatically at the desired molecular size and there are indications that a continuation of the treatment results in a building-up of the molecules back to the original alginate molecule. However, the application of too large an amount of depolymerization agent in neutral or acid solutions, and/or too long a reaction time with neutral or acid solutions results in too great a depolymerization of the alginic acid.

Highly viscous sodium alginate solutions can be decomposed in neutral or acid solution to highly fluid condition in which the precipitability through treatment with calcium salts is insignificant.

Good results are obtained according to the present invention when the oxidizing agent which causes depolymerization in solutions having a pH of 7 or more, is added in an amount not greater than 1% and preferably in an amount between 0.01 and 0.1% of the solution. Similarly, good results are obtained when a reducing agent which causes depolymerization in acid solutions is added in an amount not greater than 5% and preferably between 0.1 and 1%.

It has also been found preferable to utilize the oxidizing agent for depolymerization in solutions having a pH of 8–10 and the reducing agent for depolymerization in solutions having a pH 4–6. It is further preferable to stir the reaction solution and to heat to a temperature of about 100° C.

Untreated drilling mud, particularly colloidal suspensions of clay and water, lose in the drilled hole, through the working-in of electrolytes, its thixotropic properties, its water-binding property and by passing through a layer of clay or chalk and the taking up of drilled matter, the viscosity is increased.

It has been attempted to condition or stabilize drilling mud by the addition of starch, tannic acid, cellulose ether, sodium carbonate, or phosphates, in order to lower the viscosity of the drilling mud. This sort of conditioning, however, does not always result in the desired success.

It has been suggested to add soluble salts of alginic acid, especially sodium alginate, to drilling mud. Due to the high lime sensitivity of the known alginates, the process is rarely carried out to a successful conclusion, because the properties of the alginates are quickly lost and therefore the need for alginate is very high.

It was found, according to the present invention, that all of the above disadvantages could be removed and an important improvement in the conditioning of clay, chalk, cement and/or salt-containing drilling mud could be obtained by the addition of a depolymerized alginic acid derivative to the drilling mud.

Good results are obtained by the addition of a 5–20% solution of the depolymerized alginic acid derivative, so that the drilling mud contains about 0.05–1% by weight of dry alginate.

It was further found, according to the present invention, that the results obtained by the addition of the depolymerized alginic acid derivative to the drilling can be greatly improved by the further addition, before, with or after the addition of the depolymerized alginic acid derivative, of a viscosity-lowering substance, such as sodium carbonate, tannic acid, tannic acid derivatives, phosphates, etc. This combined addition results in an increase in the desired properties of the drilling mud, which increase is not merely additive but is actually highly synergistic.

Furthermore, it has been found, that the condition of the drilling mud, especially the water-binding properties thereof is still further improved and the stabilization lasts for a longer time, if in addition to the depolymerized alginate and the possible addition of viscosity-lowering substances, a further addition of a reducing agent is made, for example polyoxybenzol, hydroquinone, sulphides, aldehydes such as formaldehyde, benzaldehyde and the like.

A further synergistic result is obtained by the addition of known polymerized substances which are used for the conditioning of drilling mud, for example cellulose glycolate, having the trade name of Tylose, in combination with a reducing agent of the above mentioned type, and in further combination with a depolymerized alginic acid derivative.

The following examples are given as exemplatory of the process for preparing depolymerized alginic acid derivatives according to the present invention, the scope of said invention not however being limited thereto.

*Example I*

To 1 liter of a 10% aqueous sodium alginate solution is added 140 cc. of a 0.1 N potassium hydroxide solution so as to raise the pH of the sodium alginate solution to about 9. To the resulting solution is added hydrogen peroxide (30%) in an amount such that the final solution contains 0.08% $H_2O_2$. This solution is stirred and heated to about 100° C. for about 1 hour. The resulting depolymerized alginate solution was subjected to a number of tests which will be later discussed. The original solution had a viscosity of about 400,000 centistokes, whereas the final solution of depolymerized alginate had a viscosity of about 700 centistokes.

*Example II*

To 1 liter of a 5% potassium alginate solution is added 70 cc. of 0.1 N hydrochloric acid so as to lower the pH to about 5. To the resulting solution is added hydrazine sulphate in an amount such that the final solution contains about 0.6% hydrazine sulphate. The resulting solution is stirred and heated at about 100° C. for about 1 hour. The resulting depolymerized alginate was utilized, as was the alginate produced by Example I in a number of tests. The viscosity of the original solution was reduced similarly to Example I above.

The following tests were carried out with the depolymerized alginate produced according to the present invention:

A. A fine grain sand was saturated with a 5% depolymerized alginate solution produced in either of the examples. By the addition of a 40% aqueous calcium chloride solution, the sample was solidified. By pressure testing, the solidity of the sample was found to be about 7 kg./cm.$^2$.

This was compared to a similar sample of fine grain sand. A 5% sodium alginate solution, of natural sodium alginate which was not depolymerized, did not penetrate deeply enough into the sand. It was therefore necessary to dilute the solution of 1.5% so as to cause it to penetrate into the sand. After solidification of the sample and similar pressure testing, the solidity was found to be 2½ kg./cm.$^2$.

B. A clay drilling mud resulting from oil drilling which was unusable owing to the salt content, showed the following results in filtration tests:

| | |
|---|---:|
| German Andree test_____sec__ | 150 |
| Thickness of filter cake_____mm__ | 8 |
| Filtrate (cc.) 30 min_____percent__ | 7.4 |
| pH _____ | 6 |

A sample of the same mud was treated with 4% non-depolymerized sodium alginate of a 5% solution, as well as with 0.4% sodium hexametaphosphate. The results obtained were as follows:

| | |
|---|---:|
| German Andree test_____sec__ | 450 |
| Thickness of filter cake_____mm__ | 5 |
| Filtrate (cc.) 30 min_____percent__ | 5 |
| pH _____ | 7 |

A third sample of the same mud was treated with 4% of a 5% solution of depolymerized sodium alginate, as well as with 0.4% sodium hexametaphosphate. The results obtained were as follows:

German Andree test _____ sec__ 600
Thickness of filter cake _____ mm__ 3
Filtrate (cc.) 30 min _____ percent__ 2.8
pH _____ 7

The depolymerized alginate produced according to the present invention is extremely effective in drilling operations as an additive to the drilling mud.

TABLE 1

The effect of depolymerized alginates in comparison to non-depolymerized alginates, cellulose glycolate and phosphate on a clay drilling mud containing 3.5% salts, was compared as follows:

| | | | | | | |
|---|---|---|---|---|---|---|
| Depolymerized alginate | | 0.5 | | | 0.25 | |
| Non-depolymerized alginate | 0.5 | | | | | |
| Cellulose glycolate | | | 0.5 | | | 0.5 |
| Phosphate | | | | 0.8 | 0.8 | 0.8 |
| Filtrate (cc.) (30 Min) | 30 | 18.8 | 24 | 36.5 | 12.5 | 21.5 |
| Thickness of filter cake (mm.) | 9 | 5 | 5 | 9 | 3.5 | 4.5 |
| German Andree test (sec.) | 180 | 530 | 210 | 180 | 1,400 | 450 |
| Viscosity in Marsh funnel (sec.) | 185 | 400 | 80 | 80 | 87 | 66 |

TABLE 2

The effect of depolymerized alginates in comparison to non-depolymerized alginates and cellulose glycolate on a salt-free clean clay drilling mud was compared as follows:

| | | | | |
|---|---|---|---|---|
| Depolymerized alginate | | | 0.1 | |
| Non-depolymerized alginate | | | | 0.1 | |
| Cellulose glycolate | | | | | 0.1 |
| Filtrate (cc.) 30 Min | | 16.8 | 8.5 | 14.9 | 14.5 |
| Thickness of filter cake (mm.) | | 2 | 1 | 2 | 2 |
| German-Andree test (sec.) | | 240 | 1,100 | 550 | 330 |

TABLE 3

The stabilizing effect of formaldehyde with depolymerized alginate, cellulose glycolate with and without the simultaneous addition of phosphate, was tested to determine the conditioning effect on drilling mud. Results are as follows:

| Alginate depolymerization deriv. | Cellulose glycolate | Phosphate | Formaldehyde, 40% | Speed of filtration acc. to Andree in sec. after— | |
|---|---|---|---|---|---|
| | | | | 0 days | 10 days |
| 0.1 | | | | 1,800 | 240 |
| 0.1 | | | 0.02 | 1,600 | 200 |
| | 0.5 | | | 700 | 600 |
| | 0.5 | | 0.02 | 1,500 | 410 |
| 0.06 | | 0.2 | | >2,000 | 1,260 |
| 0.06 | | 0.2 | 0.02 | >2,000 | 310 |
| | 0.5 | 0.2 | | 150 | >2,000 |
| | 0.5 | 0.2 | 0.02 | 1,300 | 370 |
| | | | | | 1,080 |

Table 1 shows that a salt-containing drilling mud with poor water binding properties, through the addition of 0.5% depolymerized alginate, greatly improves the water-binding properties as compared to the addition of the same amount of cellulose glycolate or by the addition of the same amount of phosphate. Non-depolymerized alginate is not very useful for this purpose because of the high salt—particularly lime-content, of the drilling mud which causes precipitation—of the alginate. In combination with the phosphate, the water-binding property of the drilling mud with 0.25% of depolymerized alginate is much better than the combination of a double amount of cellulose glycolate with the phosphate.

Table 2 shows the effect on a salt-free clay drilling mud. This table also shows the greater water-binding properties of drilling mud when treated with depolymerized alginate as compared to treatment with the same amount of non-depolymerized alginate or of cellulose glycolate.

Table 3 shows the length of the stabilization period of a clay drilling mud treated with depolymerized alginate and formaldehyde, with and without an addition of phosphate. The drop in the water-binding property of the drilling mud after 10 days is in all cases, even with cellulose glycolate alone, improved by the addition of formaldehyde.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

In the examples mentioned above the oxidizing agents may also be e. g.: alkali- or magnesium peroxides, alkali metal chromates or permanganates, salts or organic peracids.

What is claimed as new and desired to be secured by Letters Patent is:

1. A process of preparing partially depolymerized alginic acid derivatives comprising the steps of treating at a raised temperature an aqueous solution of a water-soluble alkali metal salt of alginic acid having a pH of less than 7 with a reducing agent which does not react chemically to form derivatives of alginic acid so as to partially depolymerize said alkali metal salt of alginic acid; and collecting said partially depolymerized alkali metal salt of alginic acid.

2. A process of preparing partially depolymerized alginic acid derivatives, comprising the steps of treating at a raised temperature an aqueous solution of a water-soluble alkali metal salt of alginic acid having a pH of 4–6 with a minor proportion of a reducing agent which does not react chemically to form derivatives of alginic acid so as to partially depolymerize said alkali metal salt of alginic acid; and collecting said partially depolymerized alkali metal salt of alginic acid.

3. A process of preparing partially depolymerized alginic acid derivatives, comprising the steps of treating at a raised temperature an aqueous solution of a water-soluble alkali metal salt of alginic acid having a pH of 4–6 with a minor proportion of a reducing agent which does not react chemically to form derivatives of alginic acid in an amount of less than 5% of the total solution so as to partially depolymerize said alkali metal salt of alginic acid; and collecting said partially depolymerized alkali metal salt of alginic acid.

4. A process of preparing partially depolymerized alginic acid derivatives, comprising the steps of treating at a raised temperature an aqueous solution of a water-soluble alkali metal salt of alginic acid having a pH of 4–6 with a minor proportion of a reducing agent which does not react chemically to form derivatives of alginic acid in an amount of 0.1–1% of the total solution so as to partially depolymerize said alkali metal salt of alginic acid; and collecting said partially depolymerized alkali metal salt of alginic acid.

5. A process of preparing partially depolymerized alginic acid derivatives, comprising the steps of treating at a temperature of about 100° C. an aqueous solution of a water-soluble alkali metal salt of alginic acid having a pH of less than 7 with a reducing agent which does not react chemically to form derivatives of alginic acid so as to partially depolymerize said alkali metal salt of alginic acid; and collecting said partially depolymerized alkali metal salt of alginic acid.

References Cited in the file of this patent

UNITED STATES PATENTS

| | | |
|---|---|---|
| 2,174,027 | Ball | Sept. 26, 1939 |
| 2,400,834 | Gloahec | May 21, 1946 |
| 2,584,508 | Speakman et al. | Feb. 5, 1952 |
| 2,612,498 | Alburn | Sept. 30, 1952 |
| 2,638,469 | Alburn | May 12, 1953 |
| 2,638,470 | Alburn | May 12, 1953 |

OTHER REFERENCES

Hirst et al.: "Nature," vol. 143, page 857, 1939. (Copy in Scientific Library.)